United States Patent
Kim et al.

(10) Patent No.: US 8,557,217 B2
(45) Date of Patent: Oct. 15, 2013

(54) LOW TEMPERATURE PROCESS FOR PRODUCING NANO-SIZED TITANIUM DIOXIDE PARTICLES

(75) Inventors: Insoo Kim, Busan (KR); Woo Jin Lee, Busan (KR); Young Jin Kim, Conway, AR (US); Charles E. Smith, Jr., Conway, AR (US)

(73) Assignee: Tokusen, U.S.A., Inc., Conway, AR (US)

( * ) Notice: Subject to any disclaimer, the term of this patent is extended or adjusted under 35 U.S.C. 154(b) by 170 days.

(21) Appl. No.: 12/310,615

(22) PCT Filed: Sep. 11, 2007

(86) PCT No.: PCT/US2007/019674
§ 371 (c)(1),
(2), (4) Date: Dec. 11, 2009

(87) PCT Pub. No.: WO2008/036176
PCT Pub. Date: Mar. 27, 2008

(65) Prior Publication Data
US 2010/0226851 A1    Sep. 9, 2010

Related U.S. Application Data

(60) Provisional application No. 60/846,231, filed on Sep. 21, 2006.

(51) Int. Cl.
*C01G 23/053* (2006.01)
*C01B 15/01* (2006.01)

(52) U.S. Cl.
USPC ........... 423/610; 423/584; 423/611; 423/612; 423/615; 423/616

(58) Field of Classification Search
USPC ......................... 423/584, 610–612, 615, 616
See application file for complete search history.

(56) References Cited

U.S. PATENT DOCUMENTS

| | | | |
|---|---|---|---|
| 2,426,761 A | 9/1947 | Cambron et al. | |
| 3,377,160 A | 4/1968 | Schroeder | |

(Continued)

FOREIGN PATENT DOCUMENTS

| | | |
|---|---|---|
| CN | 1480584 A | 3/2004 |
| CN | 1509986 A | 7/2004 |

(Continued)

OTHER PUBLICATIONS

Schmidt et al., "Dissolution Kinetics of Titanium Dioxide Nanoparticles: The Observation of an Unusual Kinetic Size Effect." J. Phys. Chem. B (2006), vol. 110, pp. 3955-3963. Published on Web Feb. 7, 2006.*

(Continued)

*Primary Examiner* — Stuart Hendrickson
*Assistant Examiner* — Daniel Berns
(74) *Attorney, Agent, or Firm* — Richard Blakely Glasgow

(57) ABSTRACT

A process for synthesizing nano-sized rutile, anatase, or a mixture of rutile and anatase $TiO_2$ powder. The process includes the steps of: 1) forming a Ti-peroxo complex by mixing $H_2O_2$ with a Ti compound, and 2) heating the Ti-peroxo complex at a temperature of above 50° C. A primary particle size of $TiO_2$ particles, synthesized by the method, is below 50 nm, and an agglomerated particle size thereof after a washing/dry process is below about 10 μm. The major characteristics of the present invention are that it is a low temperature process, a highly concentrated synthesis, and high production yield of above 90%.

7 Claims, 3 Drawing Sheets

XRD data for $TiO_2$ powder obtained in Example 4.

(56) References Cited

U.S. PATENT DOCUMENTS

| | | | |
|---|---|---|---|
| 3,702,259 A | 11/1972 | Nielsen | |
| 4,186,244 A | 1/1980 | Deffeyes et al. | |
| 4,463,030 A | 7/1984 | Deffeyes et al. | |
| 5,250,101 A | 10/1993 | Hidaka et al. | |
| 5,376,328 A | 12/1994 | Hoshino et al. | |
| 5,846,511 A | 12/1998 | Kim et al. | |
| 5,935,608 A | 8/1999 | Fujikawa et al. | |
| 5,973,175 A | 10/1999 | Bruno | |
| 6,001,326 A | 12/1999 | Kim et al. | |
| 6,114,553 A | 9/2000 | Kiriki et al. | |
| 6,440,383 B1 | 8/2002 | Duyvesteyn et al. | |
| 6,444,189 B1 | 9/2002 | Wang et al. | |
| 6,517,804 B1 | 2/2003 | Kim et al. | |
| 6,660,058 B1 | 12/2003 | Oh et al. | |
| 6,706,902 B2 | 3/2004 | Sturmann et al. | |
| 6,726,891 B2 | 4/2004 | Sakatani et al. | |
| 6,770,257 B1 | 8/2004 | Imura et al. | |
| 6,969,690 B2 | 11/2005 | Zhou et al. | |
| 7,045,005 B2 | 5/2006 | Sakatani et al. | |
| 7,270,695 B2 | 9/2007 | Kim et al. | |
| 2002/0177311 A1 | 11/2002 | Schumacher et al. | |
| 2003/0185889 A1 | 10/2003 | Yan et al. | |
| 2004/0055420 A1 | 3/2004 | Garbar et al. | |
| 2004/0120885 A1 | 6/2004 | Okusako | |
| 2004/0151662 A1 | 8/2004 | Yoshida et al. | |
| 2004/0265590 A1* | 12/2004 | Schichtel | 428/403 |
| 2005/0217429 A1 | 10/2005 | Kim et al. | |
| 2005/0234178 A1 | 10/2005 | Andrews | |
| 2005/0265918 A1 | 12/2005 | Liu | |
| 2005/0271892 A1 | 12/2005 | Ogata et al. | |
| 2006/0110319 A1* | 5/2006 | Seok et al. | 423/610 |
| 2006/0251573 A1 | 11/2006 | Musick et al. | |
| 2008/0064592 A1 | 3/2008 | Kim et al. | |
| 2008/0105085 A1 | 5/2008 | Kim et al. | |

FOREIGN PATENT DOCUMENTS

| | | |
|---|---|---|
| EP | 0207542 | 1/1987 |
| EP | 0547663 A1 | 6/1993 |
| EP | 1201301 | 5/2002 |
| EP | 1279643 | 1/2003 |
| EP | 1564185 | 8/2005 |
| GB | 811828 | 4/1959 |
| GB | 2221901 | 2/1990 |
| JP | 62207718 | 9/1987 |
| KR | 0074166 | 2/1987 |
| KR | 0179371 | 12/1991 |
| KR | 2002-0078637 | 10/2002 |
| WO | WO 99/43616 | 9/1999 |
| WO | WO 01/81244 | 11/2001 |
| WO | WO 2004/041723 | 5/2004 |

OTHER PUBLICATIONS

Beckman Institute, "Bok Yeop Ahn." Univ. of Illinois at Urbana-Champaign (no date). Viewed on Mar. 18, 2013 at http://beckman.illinois.edu/directory/person/byahn.*
Sungkyunkwan Univ., "DOES Seminar on Apr. 16 16:30 by Dr. Sang Il Seok." (c) 2009 DOES. Viewed on Mar. 18, 2013 at http://does.skku.ac.kr/?document_srl=12923&mid=seminar&listStyle=&cpage=.*
Pullumbi, P. et al., "A density functional theory study of the alkali metal atom-carbon monoxide interactions: Singularity of the Li atom." J. Chem. Phys. vol. 102, issue 14, pp. 5719-5724 (Apr. 8, 1995).*
Ayed, O. et al., "Reactivity of Na and K with Carbon Monoxide in Solid Argon: An Infrared and ab Initio Study." J. Phys. Chem., vol. 92, pp. 37-45 (Jan. 1988).*
First Office Action, Chinese State Intellectual Property Office, Chinese Pat. Appl. No. 200780034373.9, Dec. 7, 2010.
Japan Patent Office, Official Action, Japanese Pat. Appl. No. 2007-536859, Nov. 12, 2010.
Abstract, espacenet database, Japanese Publ. No. JP2001206720, Jul. 31, 2001.
Abstract, espacenet database, Japanese Publ. No. JP2002154824, May 28, 2002.
Abstract, espacenet database, Japanese Publ. No. JP2005219966, Aug. 18, 2005.
Abstract, espacenet database, Japanese Publ. No. JP9002818, Jan. 7, 1997.
Abstract, espacenet database, Japanese Publ. No. JP2002047012, Feb. 12, 2002.
Abstract, espacenet database, Japanese Publ. No. JP2002249319, Sep. 6, 2002.
Extended European Search Report, European Patent Office, Appl. No. 05851218.7, Regional Phase of PCT/US2005/036727, Dec. 21, 2009.
Yokota, M., et al., Chem. Abst.: 119:206436, "Preparation of titanium (IV) oxide from titanium (IV) hydroxide precipitated from titanyl sulfate solution," 1992, pp. 1019-1022.
International Search Report and Written Opinion of International Searching Authority, PCT/US05/36745, Feb. 22, 2006.
International Preliminary Report on Patentability, PCT/US2005,036754, Apr. 17, 2007.
International Search Report and Written Opinion of International Searching Authority, PCT/US07/19674, Jan. 10, 2008.
Notice of Preliminary Rejection, Korean Intellectual Property Office, in Korean Patent Appl. No. 10-2007-7008295, Aug. 28, 2008.
Action of Korean Intellectual Property Office, Appl. No. 2007-7008371, Oct. 28, 2008.
Action of Chinese State Intellectual Property Office, Appl. No. 200580034820.1, Dec. 19, 2008.
Office Action, U.S. Patent and Trademark Office, U.S. Appl. No. 11/664,711, Feb. 16, 2010.
International Preliminary Report on Patentability and Annexes, International Application No. PCT/US2007/019674, Mar. 20, 2009.
Office Action, U.S. Patent and Trademark Office, U.S. Appl. No. 11/664,711, Mar. 30, 2009.
Office Action, State Intellectual Property Office, People's Republic of China, Appl. No. 200580034818.4, Mar. 13, 2009.
Office Action, U.S. Patent and Trademark Office, U.S. Appl. No. 11/664,640, Apr. 28, 2009.
Office Action, U.S. Patent and Trademark Office, U.S. Appl. No. 11/664,711 (First Named Inventor: Kim, I., Filing Date: Apr. 4, 2007), Mailing Date Sep. 1, 2009.
Action of Chinese State Intellectual Property Office, Appl. No. 200580034820.1, Sep. 11, 2009.
Extended Search Report, European Patent Office, Appl. No. 05807465.9, Regional Phase of PCT/US2005/036745, Nov. 19, 2009.
Kutty, T., et al., Photocatalytic Activity of Tin-Substituted $TiO_2$ in Visible Light, Chemical Physics Letters, vol. 163, No. 1, pp. 93-97, Nov. 3, 1989.
Nishizawa, H., et al., The Crystallization of Anatase and the Conversion to Bronze-Type $TiO_2$ under Hydrothermal Conditions, Journal of Solid State Chemistry, 56, 158-165, 1985.
Cheng, H., et al., Hydrothermal Preparation of Uniform Nanosize Rutile and Anatase Particles, Chemistry of Materials, pp. 663-671, 1995.
Zheng, Y., et al., Hydrothermal Preparation and Characterization of Brookite-Type $TiO_2$ Nanocrystals, Journal of Materials Science Letters, 1445-1448, 2000.
Seokwoo, J., et al., Hydrothermal Synthesis of Er-Doped Luminescent $TiO_2$ Nanoparticles, Chemical Materials, pp. 1256-1263, Feb. 28, 2003.
Office Action, Japanese Patent Office, Japanese Pat. Appl. No. 2009-529184, Issued Aug. 14, 2012.
Second Office Action, Chinese State Intellectual Property Office, Chinese Pat. Appl. No. 200780034373.9, Mar. 27, 2012.

* cited by examiner

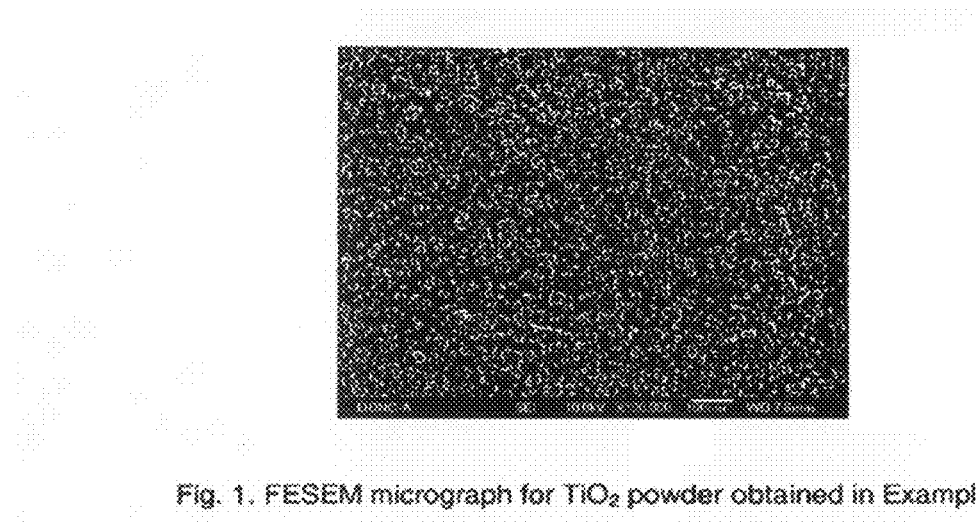
Fig. 1. FESEM micrograph for $TiO_2$ powder obtained in Example 1
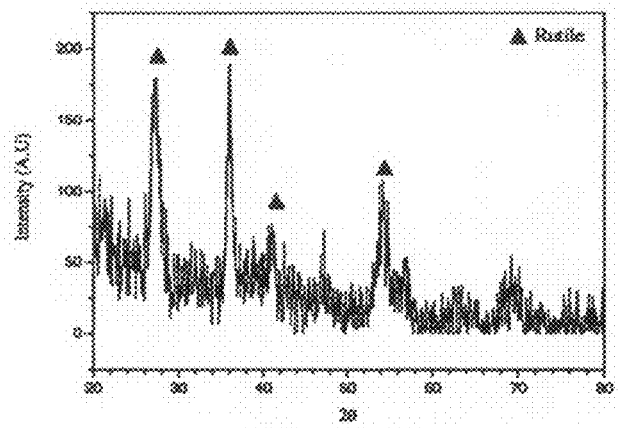
Fig. 2. XRD data for $TiO_2$ powder obtained in Example 1.

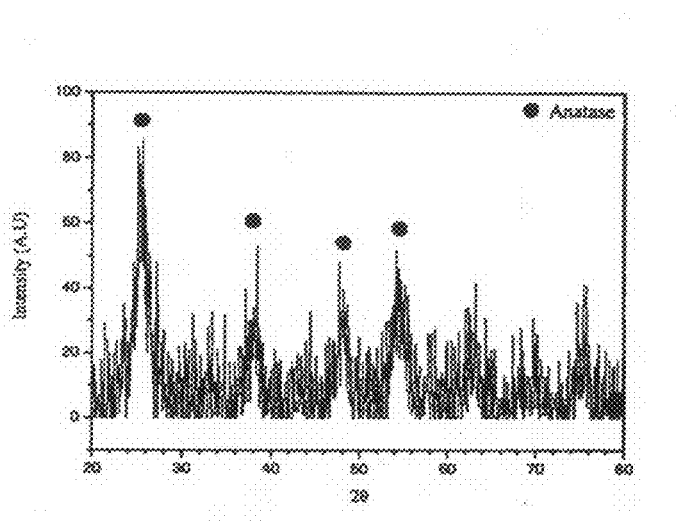
Fig. 3. XRD data for TiO₂ powder obtained in Example 2.
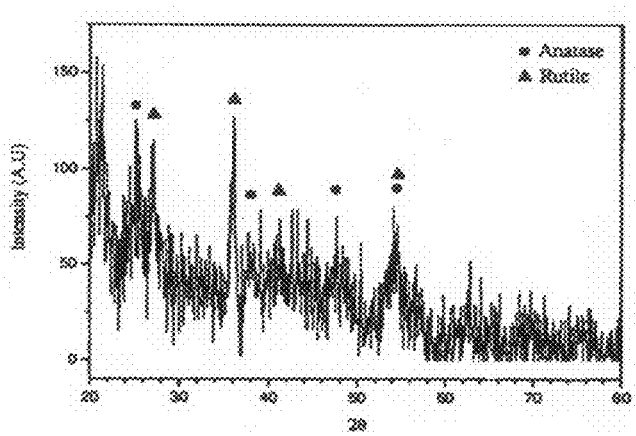
Fig. 4. XRD data obtained for TiO₂ powder obtained in Example 3.

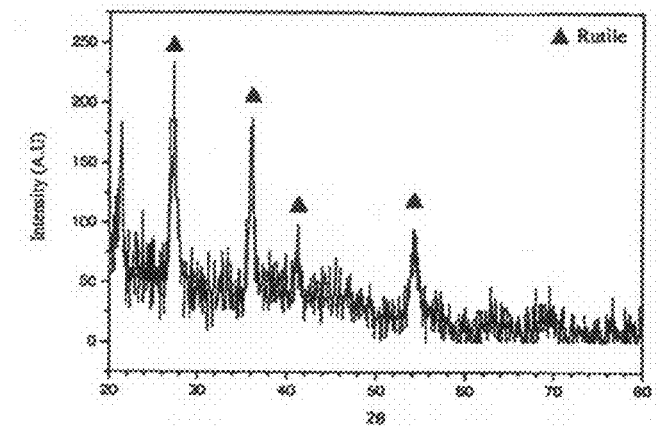
Fig. 5. XRD data for $TiO_2$ powder obtained in Example 4.
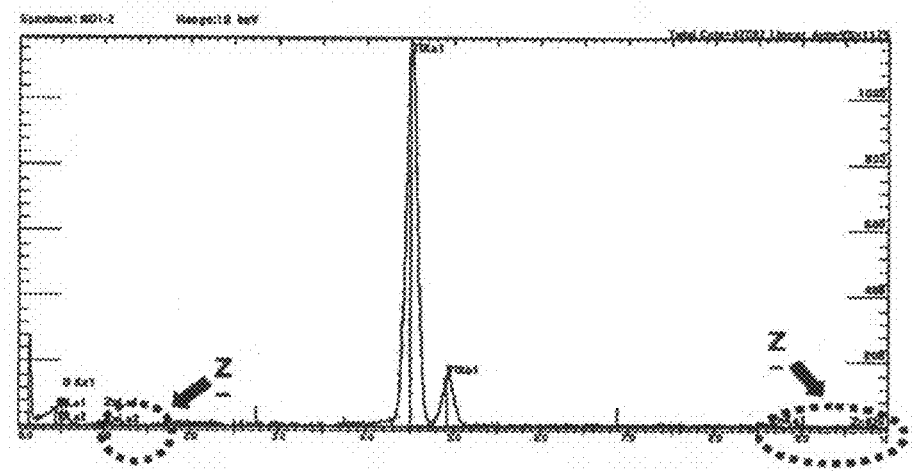
Fig. 6. EDS analysis results for $TiO_2$ powder obtained in Example 4.

LOW TEMPERATURE PROCESS FOR PRODUCING NANO-SIZED TITANIUM DIOXIDE PARTICLES

This application claims the benefit of U.S. Provisional Patent Application No. 60/846,231 filed Sep. 21, 2006, the disclosure of which is incorporated herein by reference in its entirety.

TECHNICAL FIELD

The present invention relates to a process for producing nano-sized titanium dioxide ($TiO_2$) particles, either rutile, anatase or a mixture of rutile and anatase, of which the primary particle size is about 10 to 50 nm and of which an agglomerated particle size after drying is about 10 μm or less. The major characteristics of the process are that it is a low temperature process that can operate below 100° C., that it is produces a highly concentrated reaction product above 2.5M $TiO_2$, that it has a high production yield of above 90%, and that it is a simplified process.

BACKGROUND ART

Titanium dioxide is a material having diverse fields of application such as paints, plastics, cosmetics, inks, paper, chemical fiber, and optical catalysts. $TiO_2$ is currently being produced all over the world using a sulfate and chloride process.

The sulfate process was commercialized in 1916 by a Norwegian company called Titan; this process produces $TiO_2$ through a hydrolysis process and a calcination process at a temperature of 800 to 1000° C., and produces $TiO_2$ powder through a pulverization process.

The chloride process was more recently developed in 1956 by Du Pont, a U.S. company. The major production reaction is a process of reacting $TiCl_4$ with oxygen at a temperature of about 1500° C., thereby producing $TiO_2$. Relative to the sulfate process, the chloride process has advantages in that the amount of waste is reduced, continuous processing is possible, and high-quality rutile $TiO_2$ is produced; and hence the chloride process accounts for approximately 60% of the worldwide $TiO_2$ production.

However, since Impurities are mixed and fed in and the reaction temperature is high during the sulfate and chloride processes, the sulfate and chloride processes are disadvantageous for synthesizing high-purity $TiO_2$ particles with the submicron or nano size. As a result, many studies about a method of synthesizing nano-sized $TiO_2$ particles have now been conducted.

Kim et al. disclosed a low temperature synthesis process of nano-sized rutile and a mixture of rutile and anatase in U.S. Pat. No. 6,001,326. They obtained rutile and a mixture of rutile and anatase by diluting an aqueous titanyl chloride solution to a concentration of about 0.2 to 1.2 and heating the diluted aqueous titanyl chloride solution at a temperature in the range of 15 to 155° C.

Musick et al. suggested a method of modifying a chloride process and synthesizing nano-sized powder in U.S. Published Patent Application No. 2006/0251573 A1. They described a method of synthesizing nano-sized particles with a size of about 80 to 100 nm by reacting titanium tetrachloride at a temperature of above 800° C. and with a pressure of about 5 to 25 psig in the presence of water vapor.

Yang et al. disclosed a process of producing rutile $TiO_2$ using $TiCl_4$ in Korean Patent No. 10-0420275. They suggested a method of producing crystalline $TiO_2$ by preparing Ti aqueous solution of 0.1M to 1.4M by adding 0.01 to 5M of mineral acid and distilled water to $TiCl_4$ at a temperature of −10 to 10° C., heating the prepared Ti aqueous solution at a temperature of 15 to 200° C. for about 24 hours, adding an alkali aqueous solution to the heated Ti aqueous solution, and then adjusting a final pH of the solution to 6 to 8.

The limitations of the prior art are overcome by the present invention as described below.

DISCLOSURE OF THE INVENTION

The present invention is a simplified process that still provides a lower temperature process of producing more highly concentrated $TiO_2$ as compared to the conventional methods developed so far. The present invention is a process for synthesizing nano-sized rutile, anatase or a mixture of rutile and anatase $TiO_2$ powder. The process can operate below 100° C., wherein a highly concentrated synthesis is possible, and with a high production yield of above 90%. A primary particle size of $TiO_2$ particles synthesized by the process of the present invention is about 10-50 nm, and an agglomerated particle size thereof after a washing/drying process is below about 10 μm.

The process comprises the steps of forming a Ti-peroxo complex by mixing a titanium compound, such as $TiCl_4$ or/and $TiOCl_2$, with hydrogen perioxide ($H_2O_2$) and then heating the Ti-peroxo complex at a temperature above 50° C. to make a solution containing nano-sized $TiO_2$.

BRIEF DESCRIPTION OF THE DRAWINGS

FIG. 1 is an FE-SEM micrograph of $TiO_2$ powder obtained in Example 1.

FIG. 2 is a graph of XRD data for $TiO_2$ powder obtained in Example 1.

FIG. 3 is a graph of XRD data for $TiO_2$ powder obtained in Example 2.

FIG. 4 is a graph of XRD data for $TiO_2$ powder obtained in Example 3.

FIG. 5 is a graph of XRD data for $TiO_2$ powder obtained in Example 4.

FIG. 6 is a graph of EDS analysis results for $TiO_2$ powder obtained in Example 4.

BEST MODE FOR CARRYING OUT THE INVENTION

The object of this invention is to provide a process suitable for commercial production of nano-sized $TiO_2$ in either rutile; anatase or a mixture of rutile and anatase phases. The major characteristics of this invention are that it can be operated at a low temperature with a high production yield of above 90%, and highly concentrated $TiO_2$ solution of above 2.5 molarity.

The process comprises the steps of forming a Ti-peroxo complex by mixing a titanium compound, such as $TiCl_4$ or/and $TiOCl_2$, with hydrogen peroxide ($H_2O_2$) and then heating the Ti-peroxo complex at a temperature of above 50° C. to make a solution containing nano-sized $TiO_2$. The titanium compound may be selected from the group consisting of $TiCl_4$, $TiOCl_2$, $TiCl_3$, $TiBr_4$, $Ti(SO_4)_2 \cdot mH_2O$, $TiOSO_4 \cdot nH_2O$, Tetra Methoxy Titanium, Tetra Ethoxy Titanium, Tetra-n-Propoxy Titanium, Tetra Iso Propoxy Titanium, Tetra-n-Butoxy Titanium, Tetra Iso Butoxy Titanium, Tetra-Sec-Butoxy Titanium, Tetra-T-Butoxy Titanium, Tetra Alkoxy Titanium, and Tetra Stearyl Oxy Titanium and a combination of the preceding.

The formation of the Ti-peroxo complex, which is needed to form TiO$_2$ particles, can be obtained by adding H$_2$O$_2$ and H$_2$O to the Ti compound. Here, about 0.1 to 10 mol, or preferably about 1 to 4 mol of H$_2$O$_2$ is added to a concentration of 3 mol of Ti ions. A final volume is made in about 1 liter by adding H$_2$O to the remaining concentration of Ti ion. A point in time to add H$_2$O may be before or after adding H$_2$O$_2$ to the Ti compound, or H$_2$O may be added to the Ti compound together with H$_2$O$_2$.

The color of the solution when H$_2$O$_2$ is added changes into reddish brown, which tells us that the Ti-peroxo complex is now formed. In an acidic condition with the pH below 1, a forming reaction of the Ti-peroxo titanium complex follows as:

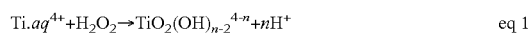

$$\text{Ti}.aq^{4+} + H_2O_2 \rightarrow TiO_2(OH)_{n-2}^{4-n} + nH^+ \qquad \text{eq 1}$$

The formation of the Ti-peroxo complex by addition of H$_2$O$_2$ is an exothermic reaction and thus generates heat. The excessive thermal generation in the solution may cause generation of anatase TiO$_2$. Thus, to form pure rutile TiO$_2$, it is necessary to reduce the temperature of the solution to below 50~60° C. while adding H$_2$O$_2$. Also, even when raising the pH value by forming the Ti-peroxo complex and then adding alkali materials, it may promote the formation of anatase TiO$_2$. Thus, adding of additional alkali materials should be avoided to form rutile TiO$_2$. To accelerate the formation of anatase TiO$_2$, the H$_2$O$_2$ and titanium compound may be mixed with a chemical selected from the group consisting of an alkali, a compound containing SO$_4^{2-}$, NO$_3^-$ and F$^-$ and a combination of the preceding. The alkali may be selected from the group consisting of NH$_4$OH, NaOH, KOH, LiOH, Ca(OH)$_2$, Mg(OH)$_2$, Ba(OH)$_2$, Na$_2$CO$_3$, K$_2$CO$_3$, Hydroxyl amine, Hydrazine and Ethanol amine. The compound containing SO$_4^{2-}$, NO$_3^-$ and F$^-$ ions may be selected from the group consisting of H$_2$SO$_4$, HNO$_3$ and NaF.

As shown in FIG. 1, the formation of the Ti-peroxo complex through a mixture of TiOCl$_2$ and H$_2$O$_2$ reacts by the ratio of 1:1 mol. Accordingly, in the forming reaction of rutile TiO$_2$ by dissolution of the Ti-peroxo complex, it is expected that a complete reaction may occur when the ratio of (number of moles of H$_2$O$_2$)/(number of TiOCl$_2$) is above 1. However, even when the molar ratio was below 1, i.e. 0.33, the production yield of 90% or higher was observed. It is believed that nuclei of ruffle TiO$_2$, which is formed by dissolution of the Ti-peroxo complex, promotes the formation of rutile TiO$_2$ in the solution.

The solution of the Ti-peroxo complex, which is formed by means of the above-described process, is heated at a temperature of above 50° C., or more preferably at a temperature within the range of between 80 and 100° C. When the temperature was below 80° C., there was a tendency that the production yield decreased. Conversely, when the temperature is above 100° C., pressurization equipment must be used and thus it is not believed to be a desirable condition.

Two methods may be used for doping or coating TiO$_2$ into a proper metal. The first method is adding a metal salt, which is soluble in solution during the process of forming a Ti-peroxo complex, and then heating the solution. In this case, the heating and the pH conditions are the same as the conditions for synthesizing pure TiO$_2$. It is believed that metal ions, which exist as ions in the Ti-peroxo complex, are adsorbed in or onto the surface of nano-sized TiO$_2$ particles formed during a process of forming TiO$_2$ particles. In the second method, the Ti-peroxo complex is heated to form TiO$_2$ particles and then metal salts are added. It is believed that the added metal salts are adsorbed onto the surface of the formed TiO$_2$ particles and will be changed into oxide during a heating and drying process. Materials that can be used for doping and coating are metal salts containing a metal selected from V, Cr, Mn, Fe, Co, Ni, Cu, Zn, Ge, Mo, Ru, Rh, Pd, Ag, Sn, W, Pt, Au, Sr, Al and Si.

The pH level of the TiO$_2$ solution formed after the reaction was below 1, showing a strong acid, and precipitated on the bottom of the reactor. After the precipitation, impurities present in the TiO$_2$ solution were completely removed by carrying out a process of throwing away an upper solution and then pouring in distilled water twice or three times, adding alkali materials such as NaOH and KOH, and thus repeating the washing process while adjusting the final pH to a concentration between 4 and 10. TiO$_2$ particles of which an initial particle size is below 50 nm and an agglomerated particle size is below 10 μm were obtained from the solution by completely eliminating the water from the TiO$_2$ solution from which impurities were removed using centrifugal separation, and finally cleaning and drying the TiO$_2$ solution with alcohol.

Example 1

A yellow TiOCl$_2$ solution was prepared by dropping TiCl$_4$ in ice and diluting the solution until a concentration of Ti ions became about 4M to 5.5M. The TiOCl$_2$ solution was stirred and agitated while slowly adding 30% H$_2$O$_2$ thereto at a molar concentration ratio identical to that of Ti. In this instance, a dark red (brown) Ti-peroxo complex was formed and heat was generated at the same time. The molar concentration of Ti ions became about 3M in the resulting solution by further adding ice. The dark red solution was heated and stirred at a temperature of about 80° C. for about 1.5 hours. After 1.5 hours, the solution was all precipitated as white 1102 crystalline phases. By neutralizing, washing, and drying the solution with NaOH, the size of initial particles, which were acquired from FE-SEM (FIG. 1) and XRD analysis (FIG. 2), was about 10 nm, and the resulting phases of XRD were all rutile.

Example 2

A dark red peroxo complex was formed by adding 30% H$_2$O$_2$ to a 24% Ti(SO$_4$)$_2$ solution at a molar concentration ratio identical to that of Ti. The pH level of the solution was made to become about 0.8 by adding NH$_4$OH to said peroxo complex. A molar concentration of Ti ions became about 0.5M by adding purified water or ice to the solution. By washing and drying a TiO$_2$ solution, which was obtained by heating and stirring the solution at a temperature of about 100° C. for more than two hours, the resulting phase of the XRD analysis (FIG. 3) were all anatase.

Example 3

A yellow TiOCl$_2$ solution was prepared by dropping TiCl$_a$ in ice and diluting the solution until a concentration of Ti became about 4M to 5.5M. The TiOCl$_2$ solution was stirred while quickly adding 30% H$_2$O$_2$ thereto at a molar concentration ratio identical to that of Ti. In this instance, a dark red (brown) Ti-peroxo complex was formed and heat was generated at the same time. The molar concentration of Ti ions became about 3M in the resulting solution by further adding purified water. The dark red solution was heated and stirred at a temperature of about 80° C. for about 1.5 hours. After 1.5 hours, the solution was all precipitated as white TiO$_2$ crystalline phases. By neutralizing, washing, and drying the solution with NaOH, the resulting phases of the XRD analysis (FIG. 4) were a mixture of anatase and rutile phases.

Example 4

A yellow $TiOCl_2$ solution was prepared by dropping $TiCl_4$ in ice and diluting the solution until a concentration of Ti became about 4M to 5.5M. The $TiOCl_2$ solution was stirred while adding $ZnCl_2$ with Zn 2.6 wt % to $TiO_2$, and slowly adding 30% $H_2O_2$ thereto at a molar concentration ratio Identical to that of Ti. In this instance, a dark red (brown) Ti-peroxo complex was formed and heat was generated at the same time. The molar concentration of Ti ions became about 3M in the resulting solution by further adding ice. The dark red solution was heated and stirred at a temperature of about 80° C. for about 1.5 hours. After 1.5 hours, the solution was all precipitated as white TiO2 crystalline phases. By neutralizing, washing, and drying the solution with NaOH, the resulting phases of the XRD analysis (FIG. 5) were all rutile. As a result of EDS analysis (FIG. 6 and Table 1), 2.59 wt % of Zn was detected.

TABLE 1

| Element | Line | Weight % | Cnts/s |
| --- | --- | --- | --- |
| O | Ka | 17.19 | 19.16 |
| Ti | Ka | 80.22 | 651.49 |
| Zn | Ka | 2.59 | 3.44 |
| Total | | 100 | |

INDUSTRIAL APPLICABILITY

The present invention is able to produce nano-sized $TiO_2$ in either rutile or anatase phases. The process is a low temperature process that achieves a high production yield of above 90%, and a highly Concentrated $TiO_2$ solution of above 2.5 mol.

The present invention has been described with reference to certain preferred and alternative embodiments that are intended to be exemplary only and not limiting to the full scope of the present invention.

The invention claimed is:

1. A process for producing nano-sized $TiO_2$, consisting essentially of the steps of:
   (a) forming an aqueous Ti-peroxo complex by mixing water, $H_2O_2$ and a titanium compound selected from the group consisting of $TiCl_4$, $TiOCl_2$, $TiCl_3$, $TiBr_4$, $Ti(SO_4)_2 \cdot mH_2O$, $TiOSO_4 \cdot nH_2O$, Tetra Methoxy Titanium, Tetra Ethoxy Titanium, Tetra-n-Propoxy Titanium, Tetra Iso Propoxy Titanium, Tetra-n-Butoxy Titanium, Tetra Iso Butoxy Titanium, Tetra-Sec-Butoxy Titanium, Tetra-T-Butoxy Titanium, Tetra Alkoxy Titanium, and Tetra Stearyl Oxy Titanium and a combination of the preceding, wherein said $H_2O_2$ and said titanium compound are mixed with a chemical selected from the group consisting of an alkali a compound containing $SO_4^{2-}$, $NO_3^-$ or $F^-$ and a combination of the preceding to accelerate the formation of anatase $TiO_2$; and
   (b) heating the aqueous Ti-peroxo complex at a temperature of above 50° C. to 100° C. to precipitate nano-sized $TiO_2$ particles.

2. The process of claim 1, wherein said alkali is selected from the group consisting of $NH_4OH$, NaOH, KOH, LiOH, $Ca(OH)_2$, $Mg(OH)_2$, $Ba(OH)_2$, $Na_2CO_3$, $K_2CO_3$, Hydroxylamine, Hydrazine and Ethanol amine.

3. The process of claim 1, wherein said compound containing $SO_4^{2-}$, $NO_3^-$ or $F^-$ ions is selected from the group consisting of $H_2SO_4$, $HNO_3$ and NaF.

4. The process of claim 1, wherein in step (a), said $H_2O_2$ and said titanium compound are mixed with a salt of a metal to form metal-doped $TiO_2$ particles.

5. The process of claim 1, further comprising the step of adding a salt of a metal to the nano-sized $TiO_2$ particles formed by steps (a) and (b) to form metal-coated $TiO_2$ particles.

6. The process of claim 4, wherein said metal is selected from the group consisting of V, Cr, Mn, Fe, Co, Ni, Cu, Zn, Ge, Mo, Ru, Rh, Pd, Ag, Sn, W, Pt, Au, Sr, Al and Si.

7. The process of claim 5, wherein said metal is selected from the group consisting of V, Cr, Mn, Fe, Co, Ni, Cu, Zn, Ge, Mo, Ru, Rh, Pd, Ag, Sn, W, Pt, Au, Sr, Al and Si.

* * * * *